(12) United States Patent
Sekine et al.

(10) Patent No.: US 9,988,294 B2
(45) Date of Patent: Jun. 5, 2018

(54) DESALINATION SYSTEM AND DESALINATION METHOD

(71) Applicant: HITACHI, LTD., Tokyo (JP)

(72) Inventors: Yasunori Sekine, Tokyo (JP);
Kazuhiko Noto, Tokyo (JP); Akira Sasaki, Tokyo (JP); Kotaro Kitamura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days. days.

(21) Appl. No.: 15/403,661

(22) Filed: Jan. 11, 2017

(65) Prior Publication Data
US 2017/0121203 A1 May 4, 2017

Related U.S. Application Data

(62) Division of application No. 14/232,955, filed as application No. PCT/JP2012/070792 on Aug. 16, 2012.

(30) Foreign Application Priority Data

Aug. 26, 2011 (JP) ................................. 2011-184648

(51) Int. Cl.
*C02F 9/00* (2006.01)
*B01D 61/58* (2006.01)
(Continued)

(52) U.S. Cl.
CPC .............. *C02F 9/00* (2013.01); *B01D 61/022* (2013.01); *B01D 61/06* (2013.01); *B01D 61/145* (2013.01);
(Continued)

(58) Field of Classification Search
CPC .......... C02F 1/441; C02F 1/442; C02F 1/444; C02F 2301/04; C02F 2301/043;
(Continued)

(56) References Cited

U.S. PATENT DOCUMENTS

| 5,366,635 A | 11/1994 | Watkins |
| 6,508,936 B1 | 1/2003 | Hassan |

(Continued)

FOREIGN PATENT DOCUMENTS

| JP | 2003-285058 A | 10/2003 |
| JP | 2005-279540 A | 10/2005 |

(Continued)

OTHER PUBLICATIONS

Apr. 18, 2016 Office Action issued in the Arab States of the Gulf Application No. GC 2012-22074.

(Continued)

*Primary Examiner* — Pranav N Patel
(74) *Attorney, Agent, or Firm* — Oliff PLC

(57) ABSTRACT

This desalinization system, which obtains industrial-use water and drinking water from seawater and wastewater, is provided with: a purification device that purifies wastewater by removing activated sludge therefrom; a first RO membrane that removes salt from the output of the purification device by transferring said salt to first concentrated water, thereby producing industrial-use water; a UF membrane that seawater passes through and that removes particulates from said seawater; a second RO membrane that removes salt from the treated output of the UF membrane by transferring said salt to second concentrated water, producing drinking water; an agitation device to which the second concentrated water from the second RO membrane and the first concentrated water from the first RO membrane are sent to be agitated; and a third RO membrane removing salt from the liquid mixture agitated by the agitation device by transferring said salt to third concentrated water, producing industrial-use water.

2 Claims, 6 Drawing Sheets

(51) Int. Cl.
*C02F 1/44* (2006.01)
*B01D 61/02* (2006.01)
*B01D 61/14* (2006.01)
*C02F 1/00* (2006.01)
*C02F 3/12* (2006.01)
*B01D 61/06* (2006.01)
*C02F 103/08* (2006.01)

(52) U.S. Cl.
CPC .............. *B01D 61/58* (2013.01); *C02F 1/001* (2013.01); *C02F 1/441* (2013.01); *C02F 1/444* (2013.01); *C02F 3/1273* (2013.01); *B01D 61/025* (2013.01); *B01D 2317/022* (2013.01); *B01D 2317/025* (2013.01); *C02F 3/1268* (2013.01); *C02F 2103/08* (2013.01); *C02F 2303/10* (2013.01); *Y02W 10/15* (2015.05); *Y02W 10/30* (2015.05)

(58) Field of Classification Search
CPC .......... C02F 2301/08; C02F 3/02; C02F 3/06; C02F 9/00; C02F 2303/08; B01D 61/02; B01D 61/022; B01D 61/025; B01D 61/027; B01D 61/04; B01D 61/08; B01D 61/10; B01D 61/14; B01D 61/142; B01D 61/145; B01D 61/147; B01D 61/16; B01D 61/18; B01D 61/20; B01D 61/58; B01D 2315/06; B01D 2317/08; B01D 2317/02; B01D 2317/022; B01D 2317/025
See application file for complete search history.

(56) References Cited

U.S. PATENT DOCUMENTS

| | | |
|---|---|---|
| 2005/0236840 A1 | 10/2005 | Stark et al. |
| 2006/0065597 A1 | 3/2006 | Kunczynski |
| 2011/0042306 A1 | 2/2011 | Ito et al. |
| 2011/0049048 A1 | 3/2011 | Benner et al. |
| 2012/0145630 A1 | 6/2012 | Ogiwara et al. |
| 2012/0255907 A1 | 10/2012 | Ogiwara et al. |
| 2012/0305459 A1 | 12/2012 | Takabatake et al. |

FOREIGN PATENT DOCUMENTS

| | | |
|---|---|---|
| JP | 4481345 B1 | 6/2010 |
| JP | 2010-149100 A | 7/2010 |
| WO | 2006/039534 A2 | 4/2006 |
| WO | 2010061879 A1 | 6/2010 |
| WO | 2011030589 A1 | 3/2011 |

OTHER PUBLICATIONS

Sep. 19, 2016 Office Action Issued in U.S Appl. No. 14/232,955.
Sep. 21, 2017 Office Action issued in U.S. Appl. No. 15/403,427.
Apr. 14, 2017 Office Action issued in U.S. Appl. No. 14/232,955.
Mar. 13, 2017 Office Action Issued in U.S. Appl. No. 15/406,294.
Mar. 15, 2017 Office Action issued in U.S. Appl. No. 15/403,427.
Mar. 13, 2017 Office Action Issued in U.S. Appl. No. 15/403,294.
Nov. 30, 2017 Office Actiion issued in U.S. Appl. No. 14/232,955.
Oct. 30, 2017 Office Action Issued in U.S. Appl. No. 15/403,294.
Oct. 26, 2017 Office Action in Indian Application No. 8308/CHENP/2013.
Feb. 23, 2018 Office Action Issued in U.S. Appl. No. 15/403,427.

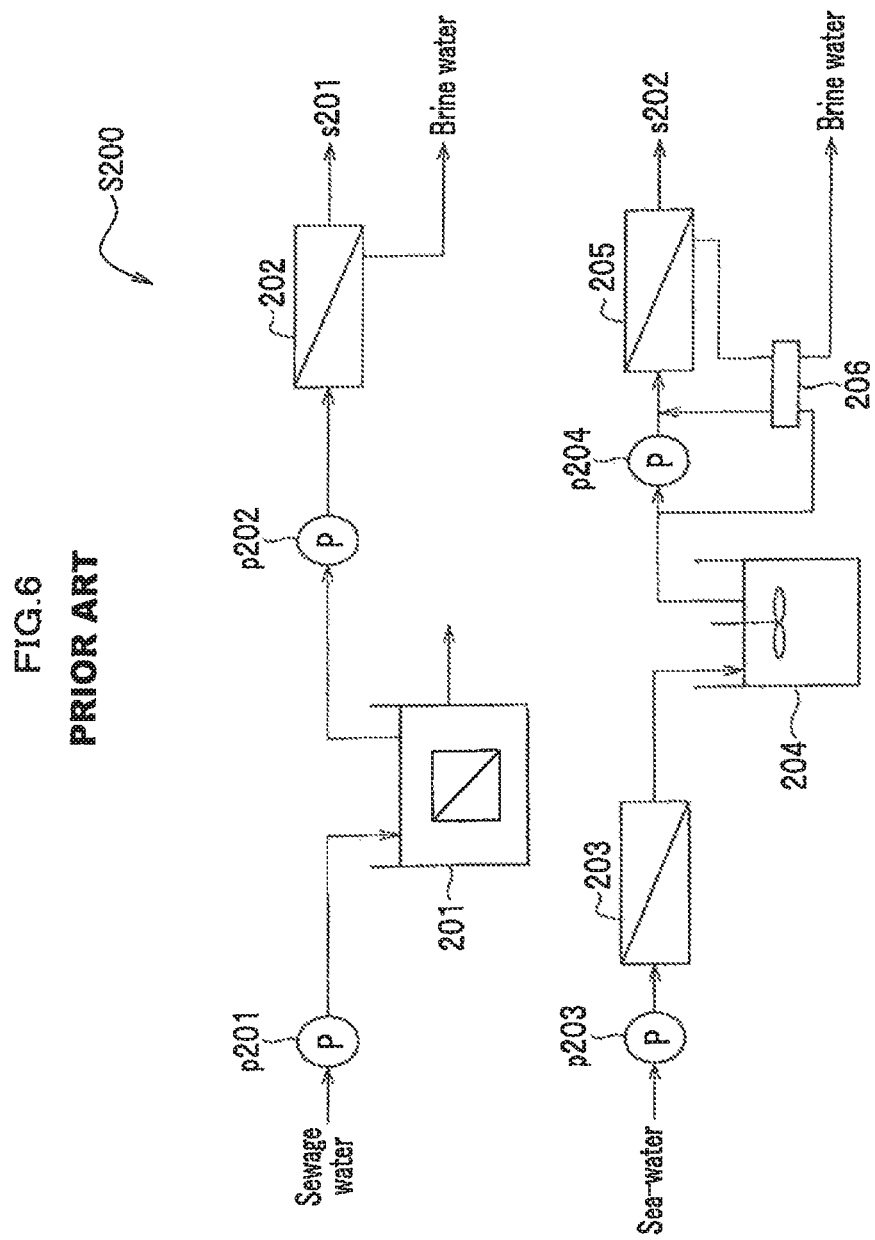

DESALINATION SYSTEM AND DESALINATION METHOD

TECHNICAL FIELD

This application is a Divisional of application Ser. No. 14/232,955 filed Jan. 15, 2014, which is a National Stage Application of PCT/JP2012/070792 filed Aug. 16, 2012. The entire disclosures of the prior applications are hereby incorporated by reference herein in their entirety.

The present invention relates to a sea-water desalination system for desalinating sea-water and sewage water and a sea-water desalination method.

BACKGROUND ART

Recently, due to the global growth of population and the broad industrial developments including emerging countries, the fresh-water-generation demands of the drinking water and the industrial water in the desert areas or the like have become definite.

Formerly, there has been a desalination system S100 shown in FIG. 5, as a system for desalinating the sea-water and the sewage water.

The production of the product water s101 (the industrial water) utilizing the sewage water in the desalination system S100 is executed as following. Incidentally, the salinity concentration of the sewage water is approximately 0.1%.

The sewage water is water-supplied to the MBR (Membrane Bioreactor) 101 by the pump p101, and the activated sludge or the like of the solid contents in the sewage water is removed by the MBR 101, then the MBR permeable water which has permeated the MBR 101 is water-supplied to the low-pressure RO membrane (Reverse Osmosis Membrane) 102 by the pump p102.

Incidentally, the MBR permeable water which has permeated the MBR 101 has the salinity concentration of approximately 0.1% which is low, therefore, as the RO membrane, the low-pressure RO membrane 102 which is an RO membrane (reverse osmosis membrane) of the low-pressure of approximately 1 to 2 MPa (mega-pascal) is utilized.

By permeating the low-pressure RO membrane 102, almost a half of the concentrated-water s104 including the impurities of the salinity or the like is removed, and the MBR permeable water water-supplied by the pump p102 is desalinated, then the industrial water of the remaining half of product water s101 is produced.

To the contrary, the concentrated-water s104 which includes the impurities of the salinity or the like removed by the low-pressure RO membrane 102 and is approximately ½ in volume of the sewage water concentrated to the salinity concentration of approximately 0.2%, is water-supplied from the low-pressure RO membrane 102 to the stirring-vessel 104.

The production of the industrial water which is the product water s102 from the sea-water in the desalination system S100 is executed as following. Incidentally, the salinity concentration of the sea-water is 3 to 4% approximately.

The sea-water is water-supplied to the UF membrane 103 by the pump p103, and water-supplied to the stirring-vessel 104, removing particles by the UF membrane 103. In the stirring-vessel 104, the UF membrane permeation sea-water which has permeated this UF membrane 103 and the concentrated-water s104 which is approximately ½ in volume of the sewage water concentrated from the sewage water by the aforementioned low-pressure RO membrane 102 are stirred and water-supplied to the intermediate-pressure RO membrane 105 by the pump p104, thereafter.

The UF membrane permeation sea-water which has permeated the UF membrane 103 has the salinity concentration of 3 to 4%, however, it is diluted by the concentrated-water s104 of the salinity concentration of 0.2%, accordingly, the intermediate-pressure RO membrane 105 of the RO membrane (reverse osmosis membrane) of approximately 3 to 5 MPa of the intermediate-pressure is utilized.

Of the mixture water s103 which has been water-supplied from the stirring-vessel 104 to the intermediate-pressure RO membrane 105 by the pump p104, by permeating the intermediate-pressure RO membrane 105, approximately ½ is removed as the brine water s105 including the impurities of the salinity or the like, and the remaining approximately ½ is produced as the desalinated product water s102 (the industrial water). In other words, the industrial water of the product water s102 is produced as ½ of the sea-water plus approximately ¼ of the sewage water in volume.

To the contrary, the brine water s105 which has been concentrated in the approximately twice the salinity concentration of the mixture water s103 including the impurities of the salinity or the like removed by the intermediate-pressure RO membrane 105, is removed from the intermediate-pressure RO membrane 105. In other words, the brine water s105 is drained as ½ of the sea-water plus approximately ¼ of the sewage water in volume.

Incidentally, the pressure energy of the brine water s105 is recovered as the rotational energy by the energy recovery device 106, and is utilized as the power source (energy source) of the pressure-transfer to the intermediate-pressure RO membrane 10 of a part of the mixture water s103 which has by-passed the pump p104.

As another conventional desalination system, there is a desalination system S200 shown in FIG. 6, The desalination system S200 doesn't supply the concentrated-water s104 of the sewage water in the desalination system S100 of FIG. 5 to the stirring-vessel 204, and constitutes the desalination of the sewage water and the desalination of the sea-water independently.

In the desalination system S200, the sea-water with the high the salinity concentration is not diluted by the supply from the sewage water (the concentrated-water s104 of the sewage water of FIG. 5) by the stirring-vessel 204, therefore, the high-pressure RO membrane 205 which has the salinity concentration as high as approximately 3 to 4% and the high-pressure of approximately 6 to 8 MPa is The other configuration is similar to the desalination system S100 of FIG. 5, accordingly, the components of the desalination system S100 are shown with references in the two-hundred range and the in-depth descriptions are omitted.

In the desalination system S200, the sewage water permeates the low-pressure RO membrane 202 and is desalinated, and the industrial water which is the product water s201 of approximately a half of the sewage water can be acquired. To the contrary, the sea-water permeates the high-pressure RO membrane 205 and is desalinated, and the drinking water which is the product water s202 of a ½ amount of the sea-water can be acquired.

The conventional desalination system S100 (See FIG. 5) has following advantages, compared to the desalination system S200 (See FIG. 6).

Firstly, in the desalination system S100 of FIG. 5, the drainage (the concentrated-water s104) removed in the process for fresh-water-generating the product water s101 from the sewage water is utilized in the process for fresh-water-generating the product water s102 from the sea-water, therefore, there are advantages to be capable of increasing the production amount of the product water from the sea-water.

More specifically, in the case not to utilize the drainage (the concentrated-water s104) from the sewage water, regarding the product water from the sea-water, it is possible to water-intake more industrial water of the product water s102 as much as the water-increased volume of approximately ½ of the sewage water, in place of the approximately ½ of the sea-water in volume.

Secondly, regarding the sea-water (the salinity concentration 3 to 4% approximately), the concentrated-water s104 (the salinity concentration 0.2% approximately) in the low-pressure RO membrane 102 of the sewage water is added, therefore, the sea-water is diluted and the salinity concentration is decreased. Therefore, in the case not to utilize the drainage the concentrated-water s104) from the sewage water, the high-pressure RO membrane was required because the sea-water has the high the salinity concentration, however, due to the dilution by the concentrated-water s104, the intermediate-pressure RO membrane 105 is sufficient, and the power of the pump p104 can be decreased, compared to the case of the high-pressure RO membrane.

Incidentally, in comparison with the permeation pressure of the intermediate-pressure RO membrane of approximately 3 to 5 MPa, the permeation pressure of the high-pressure RO membrane is approximately 6 to 8 MPa, and in order to permeate the high-pressure RO membrane, the larger power (energy) than the intermediate-pressure RO membrane is required.

Incidentally, there is Patent Literature 1 as a prior art reference in respect of the present invention,

PRIOR ART REFERENCE

Patent Literature

[Patent Literature 1] JP 4481345 A

SUMMARY OF THE INVENTION

Problems To Be Solved By The Invention

Incidentally, the conventional desalination system S100 shown in FIG. 5 has following problems.

Firstly, there is generally a large demand of the drinking water, however, it is impossible to produce the drinking water from the sea-water, in order to mix a part of the sewage water (the concentrated-water s104) in the process for desalinating the sea-water. Secondly, though the supply amount of the sea-water is normally large compared to the supply amount of the sewage water in many cases, in the case that the supply amount of the sea-water is large, the effect to add the sewage water in the process for desalinating the sea-water, decreases.

More specifically, in the case that the supply amount of the sea-water is large, even if a part of the sewage water is added to the process for desalinating the sea-water, the relative amount to the sea-water is small, therefore, the salinity concentration doesn't decrease so much, and the reduction effect of the permeation pressure to the RO membrane (corresponding to the intermediate-pressure RO membrane 105 of FIG. 5) for desalinating, decreases. As a result, the power (energy) reduction effect for acquiring the permeation pressure of the RO membrane, decreases. In addition, the water-increase effect of the product water s102 also decreases.

Thirdly, the energy recovery device 106 shows the higher efficiency in the high-pressure cases, however, since the intermediate-pressure RO membrane 105 is utilized, the energy recovery device 106 cannot be operated in the high efficiency zone, Therefore, it is difficult to acquire the high energy recovery ratio.

Fourthly, it is hard to mention that the maintainability is favorable, since the different reverse osmosis membranes of the low-pressure RO membrane 102 and the intermediate-pressure RO membrane 105 are utilized.

An object of the present invention is, in respect of the aforementioned actual condition, to provide a sea-water desalination system and a sea-water desalination method which are possible to produce the drinking water from the sea-water and also to water-increase the industrial water with inexpensive fresh-water-generation costs.

Means for Solving the Problem

In order to achieve the aforementioned purpose, a sea-water desalination system according to system A is a sea-water desalination system for acquiring the industrial water and the drinking water from the sea-water and the sewage water, comprising: a purification apparatus for removing activated sludge by permeating the sewage water and purifying; a first RO membrane for permeating the permeable water which permeated the purification apparatus and including and removing salinity thereof in first concentrated-water and also generating the industrial water; a UF membrane for removing particles in the sea-water by permeating the sea-water; a second RO membrane for permeating treated water which permeated the UF membrane and including and removing salinity of the treated water in second concentrated-water and also generating drinking water; a stirring apparatus for stirring the second concentrated-water removed by the second RO membrane and the first concentrated-water removed by the first RO membrane being sent thereto; and a third RO membrane for permeating mixture fluid stirred by the stirring apparatus, and including and removing salinity thereof in third concentrated-water and also generating the industrial water.

A sea-water desalination method according to method A is a method to realize a sea-water desalination system according to system A.

Method A is sea-water desalination method for acquiring industrial water and drinking water from sea-water and sewage water, producing industrial water by making the sewage water permeate purification apparatus and first RO membrane; producing drinking water by making the sea-water permeate UF membrane and second RO membrane; and producing industrial water by making mixture fluid which mixed first concentrated-water removed by the first RO membrane and the second concentrated-water removed by the second RO membrane permeate third RO membrane.

A sea-water desalination system according to system B is a sea-water desalination system for acquiring the industrial water and the drinking water from the sea-water and the sewage water, comprising: a purification apparatus for removing activated sludge by permeating the sewage water and purifying; a UF membrane for removing particles in the sea-water by permeating the sea-water; a first RO membrane for permeating treated water which permeated the UF membrane and including and removing salinity of the treated water in first concentrated-water and also generating the drinking water; a stirring apparatus for stirring the first concentrated-water removed by the first RO membrane and the treated water which permeated the purification apparatus being sent thereto; and a second RO membrane for permeating the mixture fluid stirred by the stirring apparatus, and including and removing salinity thereof in second concentrated-water and also generating the industrial water.

A sea-water desalination method according to method B is a method to realize a sea-water desalination system according to system B.

Method B is a sea-water desalination method for acquiring industrial water and drinking water from sea-water and sewage water, removing activated sludge and purifying by making the sewage water permeate purification apparatus; producing drinking water by making the sea-water permeate UF membrane and first RO membrane; and producing industrial water by making mixture fluid which mixed first concentrated-water removed by the first RO membrane and the treated water which permeated the purification apparatus permeate second RO membrane.

Effect Of The Invention

The sea-water desalination system and. the sea-water desalination method of the present invention can realize the sea-water desalination system and the sea-water desalination method which are capable of producing the drinking water from the sea-water and also to water-increase the industrial water with inexpensive fresh-water-generation costs.

BRIEF DESCRIPTION OF THE DRAWINGS

FIG. 6 is a conceptual configuration diagram showing the other conventional desalination system.

MODES FOR CARRYING OUT THE INVENTION

Figure 1:
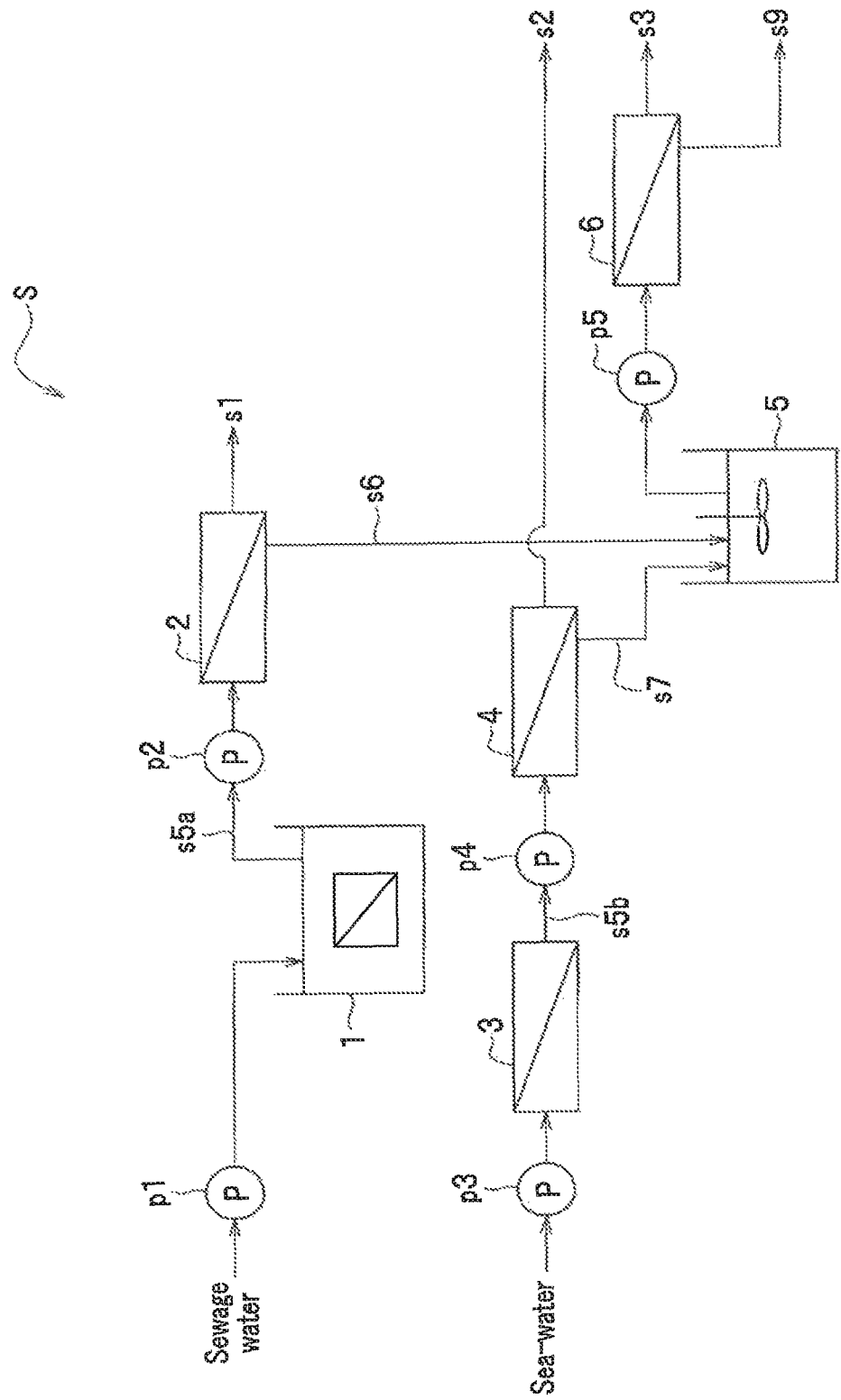
FIG. 1 is a conceptual configuration diagram of the desalination system of the embodiment 1 with reference to the present invention.

Hereinafter, the embodiments of the present invention are described with reference to the attached drawings.
<<Embodiment 1>>
FIG. 1 is a conceptual configuration diagram of the desalination system of the embodiment 1 with reference to the present invention.

The desalination system S of the embodiment 1 comprises an MBR (Membrane Bioreactor) 1 for removing the activated sludge or the like from the sewage water and purifying, and a low-pressure RO membrane (Reverse Osmosis Membrane) 2 for removing the impurities of the salinity, ions or the like included in the sewage water and desalinating, in order to produce the industrial water s1 from the sewage water.

The MBR 1 performs the solid-liquid separation, removes the activated sludge or the like (solid contents, bacteria or the like) from the sewage water, and purifies.

The RO membrane (reverse osmosis membrane) is a semipermeable membrane to pass water, however, hardly to pass low molecular substances of the salinity or the like and ions. The low-pressure RO membrane 2 is a low-pressure RO membrane for removing the salinity or the like by the permeation pressure approximately 1 to 2 MPa (mega-pascal) which is relatively low, since the salinity concentration of the sewage water is 0.1% approximately, which is low.

Furthermore, the desalination system S comprises a UF membrane (Ultrafiltration Membrane) 3 for removing the particles included in the sea-water, and a high-pressure RO membrane 4 for removing the salinity included in the sea-water and the impurities of the ions or the like and desalinating, in order to produce the drinking water s2 from the sea-water.

The UF membrane (ultrafiltration membrane) 3 performs the screening of the molecule levels depending on the pore size of the membrane and the molecule size of the to-be-excluded substances in the sea-water, and removes the substances which are to-be-excluded.

The high-pressure RO membrane 4 is a high-pressure RO membrane for removing the salinity or the like by the relatively high permeation pressure of approximately 6 to 8 MPa (mega-pascal), since the salinity concentration of the sea-water is 3 to 4% approximately.

Furthermore, in order to produce the industrial water s3 from the sea-water, in addition to the aforementioned UF membrane 3 and the high-pressure RO membrane 4, the desalination system S comprises a stirring-vessel 5 tier stirring the sea-water concentrated-water s7 including the salinity and the impurities of ions or the like removed from the high-pressure RO membrane 4 and the sewage water concentrated-water s6 including the salinity and the impurities of ions or the like removed from the low-pressure RO membrane 2, and a high-pressure RO membrane 6 for removing the salinity and the impurities of ions or the like included in the mixture fluid from the stirring-vessel 5 and desalinating.

The high-pressure RO membrane 6 desalinates the mixture fluid of the sea-water concentrated-water s7 of the salinity concentration (approximately 6 to 8% salinity concentration) which is almost twice of the sea-water and the sewage water concentrated-water s6 of the salinity concentration (approximately 0.2% salinity concentration) which is almost twice of the sewage water, and is a high-pressure RO membrane for removing the salinity or the like by the relatively high permeation pressure, approximately 6 to 8 MPa (mega-pascal) thereby. Incidentally, the sea-water concentrated-water s7 of the salinity concentration of approximately 6 to 8% which is almost twice of the sea-water, is diluted by adding the sewage water concentrated-water s6 (approximately 0.2% salinity concentration) and the salinity concentration is decreased.

Subsequently, a process for fresh-water-generating the industrial water s1 from the sewage water in the desalination system S is described.

The sewage water is water-supplied to the MBR 1 by the pump p1 and permeates the MBR 1, and the activated sludge flocks, bacteria and the like are removed from the sewage water. The MBR permeable water s5a of the sewage water which has permeated the MBR 1 is water-supplied to the low-pressure RO membrane 2 by the pump p2, and the sewage water concentrated-water s6 including the impurities of the salinity, ions or the like is removed and desalinated by permeating the low-pressure RO membrane 2, then the industrial water s1 is produced.

In the industrial water s1, while approximately ½ of the sewage water can be acquired, the remainder of the sewage water, that is to say, approximately ½ of the sewage water is removed as the sewage water concentrated-water s6 including the impurities of the salinity, ions or the like.

The sewage water concentrated-water s6 which includes the impurities of the salinity, ions or the like removed by the low-pressure RO membrane 2 and is concentrated to the salinity concentration of 0.2% approximately, is water-supplied from the low-pressure RO membrane 2 to the stirring-vessel 5.

Subsequently, a process for fresh-water-generating the drinking water s2 and the industrial water s3 which are the product waters from the sea-water in the desalination system S, is described.

The sea-water is water-supplied to the UF membrane 3 by the pump p3, and the particles in the sea-water are removed by permeating the UT membrane 3. Thereafter, the UF membrane permeation sea-water s5b of the sea-water the particles of which have been removed by the UF membrane 3, is water-supplied to the high-pressure RO membrane 4 by the pump p4. In the UF membrane permeation sea-water s5b which has permeated the UF membrane 3, by permeating the high-pressure RO membrane 4, almost a half is removed as the sea-water concentrated-water s7 including the impurities of the salinity, ions or the like, and the remaining half is produced as the desalinated drinking water s2.

To the contrary, the sea-water concentrated-water s7 of the salinity concentration of 6 to 8% approximately of approximately ½ in volume of the sea-water removed by the high-pressure RO membrane 4 is stirred and diluted in the stirring-vessel 5 with the sewage water concentrated-water s6 (the salinity concentration 0.2% approximately) of approximately ½ in volume of the sewage water removed by the low-pressure RO membrane 2, and the salinity concentration of approximately 6 to 8% decreases thereby.

The mixture fluid with decreased the salinity concentrations of the sea-water concentrated-water s7 and the sewage water concentrated-water s6 is water-supplied to the high-pressure RO membrane 6 by the pump p5.

In the mixture fluid of the sewage water concentrated-water s6 and the sea-water concentrated-water s7 from the stirring-vessel 5, by permeating the high-pressure RO membrane 6, almost a half is removed as the brine water s9 including the impurities of the salinity, ions or the like, and the remaining half is produced as the desalinated industrial water s3.

The desalination system S of the embodiment 1 gives the following effects.
1. The sewage water is not mixed in the route for desalinating the sea-water, and the drinking water s2 with a large demand can be produced thereby.
2. The sewage water concentrated-water s6 of the brine water removed in the process of the desalination of the sewage water is added to the sea-water concentrated-water s7 of the brine water removed in the process of the desalination of the sea-water, and the industrial water s3 is produced, accordingly, the fresh-water-generation amount of the industrial water of the entire desalination system S can be increased.

For example, in the desalination system S of the embodiment 1, the sewage water of the amount 2 (volume 2) and the sea-water of the amount 2 (volume 2) are supposed to be desalinated.

The industrial water s1 of the amount 1 can be acquired, by permeating the low-pressure RO membrane 2, from the sewage water of the amount 2. To the contrary, the drinking water s2 of the amount 1 can be produced, by permeating the high-pressure RO membrane 4, from the sea-water of the amount 2. Furthermore, by stirring the sea-water concentrated-water s7 of the amount 1 removed by the high-pressure RO membrane 4 and the sewage water concentrated-water s6 of the amount 1 removed by the low-pressure RO membrane 2 and permeating the high-pressure RO membrane 6, the industrial water s3 of the amount 1 is water-intaken.

As a result, in the desalination system S of the embodiment 1, the drinking water s2 of the amount 1 and the industrial water s1, s3 of the amount 2 can be acquired, from the sewage water of the amount 2 and the sea-water of the amount 2.

Figure 5:
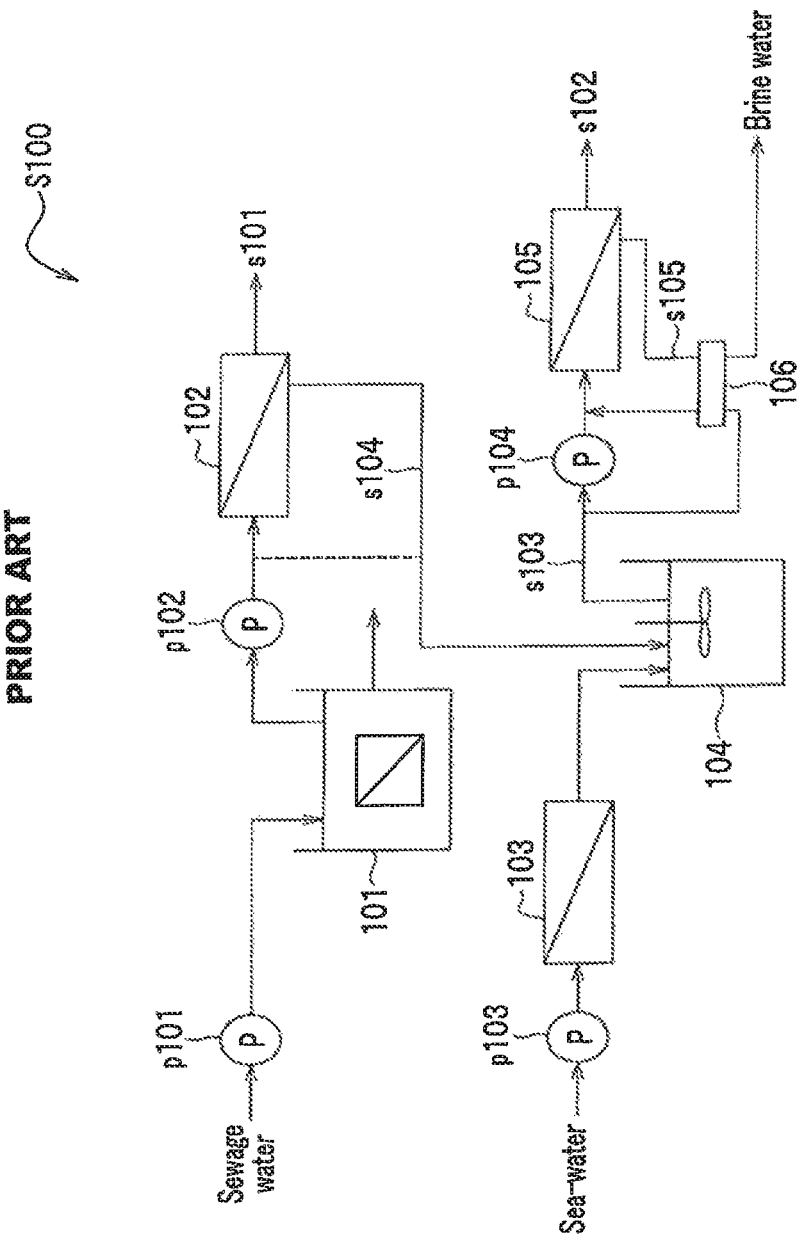
FIG. 5 is a conceptual configuration diagram showing the conventional desalination system.

In the case that the sewage water of the amount 2 and the sea-water of the amount 2 in the identical condition are desalinated by the desalination system S100 of the conventional example 1 shown in FIG. 5, it is as following.

As shown in FIG. 5, the sewage water of the amount 2 is desalinated by the low-pressure RO membrane 102, and the industrial water (the product water s101.) of the amount 1 is produced. Moreover, the concentrated-water s104 of the sewage water of the amount 1 is added to the sea-water of the amount 2 in the stirring-vessel 104, therefore, by permeating the intermediate-pressure RO membrane 105, the sea-water of the amount 2 and the industrial water (the product water s102) of the amount 1.5 of ½ of the concentrated-water s104 of the sewage water of the amount 1 are produced.

Therefore, in the desalination system S100 of the conventional example 1, the product water s101 of the amount 1 and the product water s102 of the amount 1.5 are totalized, and the industrial water of the amount 2.5 can be acquired.

Accordingly, comparing the desalination system S of the embodiment 1 and the desalination system. S100 of the conventional example 1, the desalination system S of the embodiment 1 can acquire more drinking water of the amount 0.5. Incidentally, in the desalination system S100 of FIG. 5, only the industrial water of the amount 2.5 can be acquired, however, the desalination system S of the embodiment 1 has advantages to be capable of acquiring the drinking water of the amount 1 in addition to the industrial water of the amount 2.

Moreover, in the case to desalinate the sewage water of the amount 2 and the sea-water of the amount 2 in the identical condition, by the desalination system S200 shown in FIG. 6 of the conventional example 2, it is as following.

The sewage water of the amount 2 is desalinated by permeating the low-pressure RO membrane 202 as shown in FIG. 6, and the industrial water (the product water s201) of the amount 1 can be acquired. To the contrary, the sea-water of the amount 2 is desalinated by permeating the high-pressure RO membrane 205, and the drinking water (the product water s202) of the amount 1 can be acquired.

Therefore, in the case to utilize the sewage water of the amount 2 and the sea-water of the amount 2, comparing the desalination system S of the embodiment 1 and the desalination system S200 of the conventional example 2, the desalination system S of the embodiment 1 can acquire more industrial water of the amount 1.
3. The desalination system S (See FIG. 1) can flexibly correspond to the variation of the demand of the industrial water, for example, by interrupting or adjusting the utilization of the sewage water concentrated-water s6. Therefore, it is possible to produce the industrial water, as required, and to correspond to the demand variation of the industrial water.

4. In the desalination system 5, the sea-water concentrated-water s7 of the salinity concentration of 6 to 8% approximately is diluted in the stirring-vessel 5 by the sewage water concentrated-water s6 of the salinity concentration of 0.2% approximately, accordingly, the salinity concentration decreases. Therefore, it is possible to utilize the high-pressure RO membrane 6 of the same type as the high-pressure RO membrane 4 in the down-stream side of the sea-water concentrated-water s7.

The higher the salinity concentration is, the higher-pressure RO membrane is required to be utilized, accordingly, the higher the salinity concentration is, the higher-pressure power source is required. Therefore, in the case of the sea-water concentrated-water s7 of the salinity concentration of 6 to 8% approximately, the super-high-pressure RO membrane is required to be utilized, and the power source to output the super-high-pressure is required, however, in the desalination system S of the embodiment 1, the sea-water concentrated-water s7 of the salinity concentration of 6 to 8% approximately is diluted by the sewage water concentrated-water s6 of the salinity concentration of 0.2% approximately, therefore, the high-pressure RO membrane can be utilized and it becomes possible to reduce the power.

5. Furthermore, the high-pressure RO membrane 4, 6 are the same type, therefore, it is easy for the maintenance and the maintainability is favorable. Accordingly, the advantages for the maintenance management of the desalination system S are great.

<<Embodiment 2>>

Figure 2:
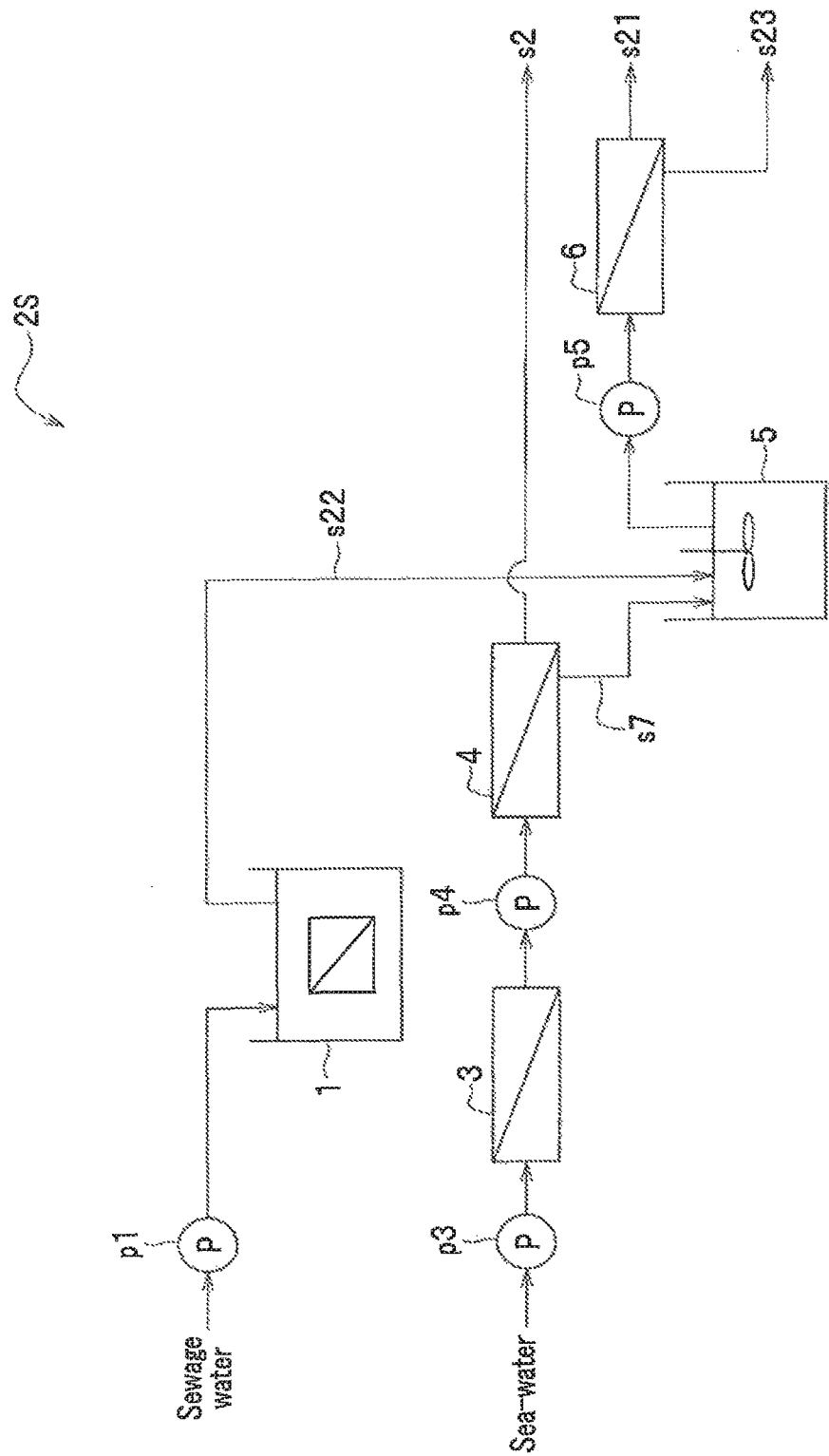
FIG. 2 is a conceptual configuration diagram showing the desalination system of the embodiment 2.

FIG. 2 is a conceptual configuration diagram showing the desalination system of the embodiment 2;

The desalination system 2S of the embodiment 2 has a configuration to omit (without installing) the low-pressure RO membrane 2 of the desalination system S of the embodiment 1. The other configuration is the configuration which is similar to the desalination system S of the embodiment 1, therefore, the identical components are shown with identical references, and the in-depth description is omitted.

In the desalination system 2S, the sewage water is water-supplied to the MBR 1 by the pump p1 and permeates the MBR 1, and the activated sludge flocks, bacteria and the like are removed from the sewage water. Thereafter, the MBR permeable water s22 which has permeated the MBR 1 is water-supplied to the stirring-vessel 5. In the stirring-vessel 5, the UF membrane 3 is permeated and also the sea-water concentrated-water s7 and the MBR permeable water s22 removed by the high-pressure RO membrane 4 are stirred and water-supplied to the high-pressure RO membrane 6 by the pump p5, thereafter.

Here, the sea-water concentrated-water s7 of the salinity concentration of approximately 6 to 8% is diluted by adding the MBR permeable water s22 of the salinity concentration of approximately 0.1% in the stirring-vessel 5 and the salinity concentration is decreased.

The mixture fluid of the sea-water concentrated-water s7 and the MBR permeable water s22 is pressurized by the pump p5, and by permeating the high-pressure RO membrane 6, a half is removed as the brine water s23 including the impurities of the salinity, ions or the like and the remaining half is produced as the desalinated industrial water s21.

In the embodiment 2, the low-pressure RO membrane 2 of the embodiment 1 is not installed, therefore, the production and the installation costs of the low-pressure RO membrane 2 are not required, and it is possible to reduce the cost.

Moreover, the RO membranes (reverse osmosis membranes) are the identical type of high-pressure RO membrane 4, 6, therefore, it is easy for the maintenance and the maintainability is further improved. Accordingly, the maintenance manageability becomes more favorable.

Incidentally, the desalination system S of the embodiment 1 gives the effects similarly.

<<Variation 1>>

Figure 3:
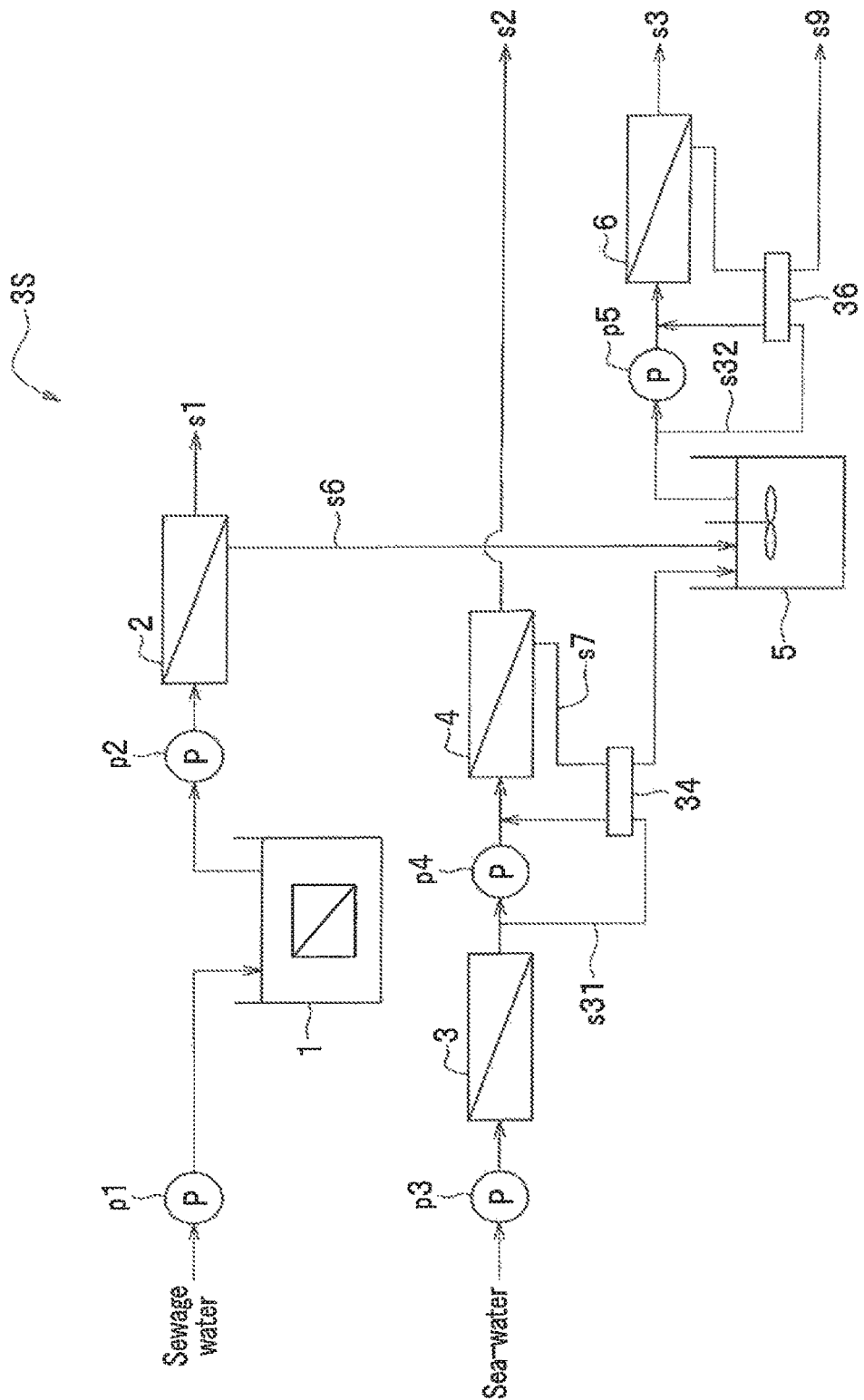
FIG. 3 is a conceptual configuration diagram showing the desalination system of the variation 1.

FIG. 3 is a conceptual configuration diagram showing the desalination system of the variation 1.

The desalination system 3S of the variation 1 is made to be a configuration to re-utilize the power by providing the energy recovery device 34, 36 respectively to the down-stream of the exclusion flow of the high-pressure RO membrane 4, 6 of the desalination system S of the embodiment 1.

The other configuration is similar to the configuration of the desalination system S of the embodiment 1, therefore, the identical components are shown with identical references, and the in-depth description is omitted.

In the desalination system 3S, the sea-water concentrated-water s7 removed by the high-pressure RO membrane 4 is pressurized to the high-pressure by the pump p4 and has the high pressure energy thereby.

Therefore, in the desalination system 3S, the energy recovery device 34 is provided in the flow-channel of the sea-water concentrated-water s7 from the high-pressure RO membrane 4.

In the energy recovery device 34, the pressure energy of the sea-water concentrated-water s7 removed by the high-pressure RO membrane 4 is recovered as the rotational energy, then, flows by-passing the pump p4 after permeating the UF membrane 3 as the power, and is utilized as the power to pressure transfer the UF membrane permeation sea-water s31 to the high-pressure RO membrane 4.

Similarly, because the brine water (the sea-water concentrated-water) s9 removed by the high-pressure RO membrane 6 has the high pressure energy, by being pressurized to the high-pressure by the pump p5.

Therefore, in the desalination system 3S, the energy recovery device 36 is provided in the flow-channel of the brine water (the sea-water concentrated-water) s9 from the high-pressure RO membrane 6.

In the energy recovery device 36, the pressure energy of the brine water (the sea-water concentrated-water) s9 is recovered as the rotational energy, then, is given to the stirring-vessel passage water s32 which flows by-passing the pump p5 after being mixed in the stirring-vessel 5 as the power, and is utilized as the power to pressure transfer the stirring-vessel passage water s32 to the high-pressure RO membrane 6.

In the desalination system 3S of the variation 1, the energy recovery device 34 is provided in the flow-channel of the down-stream of the sea-water concentrated-water s7 of the high-pressure of the exclusion flow from the high-pressure RO membrane 4 and also the energy recovery device 36 is provided in the flow-channel of the down-stream of the brine water (the sea-water concentrated-water) s9 of the high-pressure of the exclusion flow from the high-pressure RO membrane 6.

The energy recovery device 34, 36 can recover the pressure energy of the sea-water concentrated-water s7 of the high-pressure, the brine water s9 respectively as the rotational energy, and can be utilized in the high efficiency condition thereby. Therefore, the reduction of the power (energy) of the desalination system S of the embodiment 1 is possible and it is possible to achieve the energy conservation.

<<Variation 2>>

Figure 4:
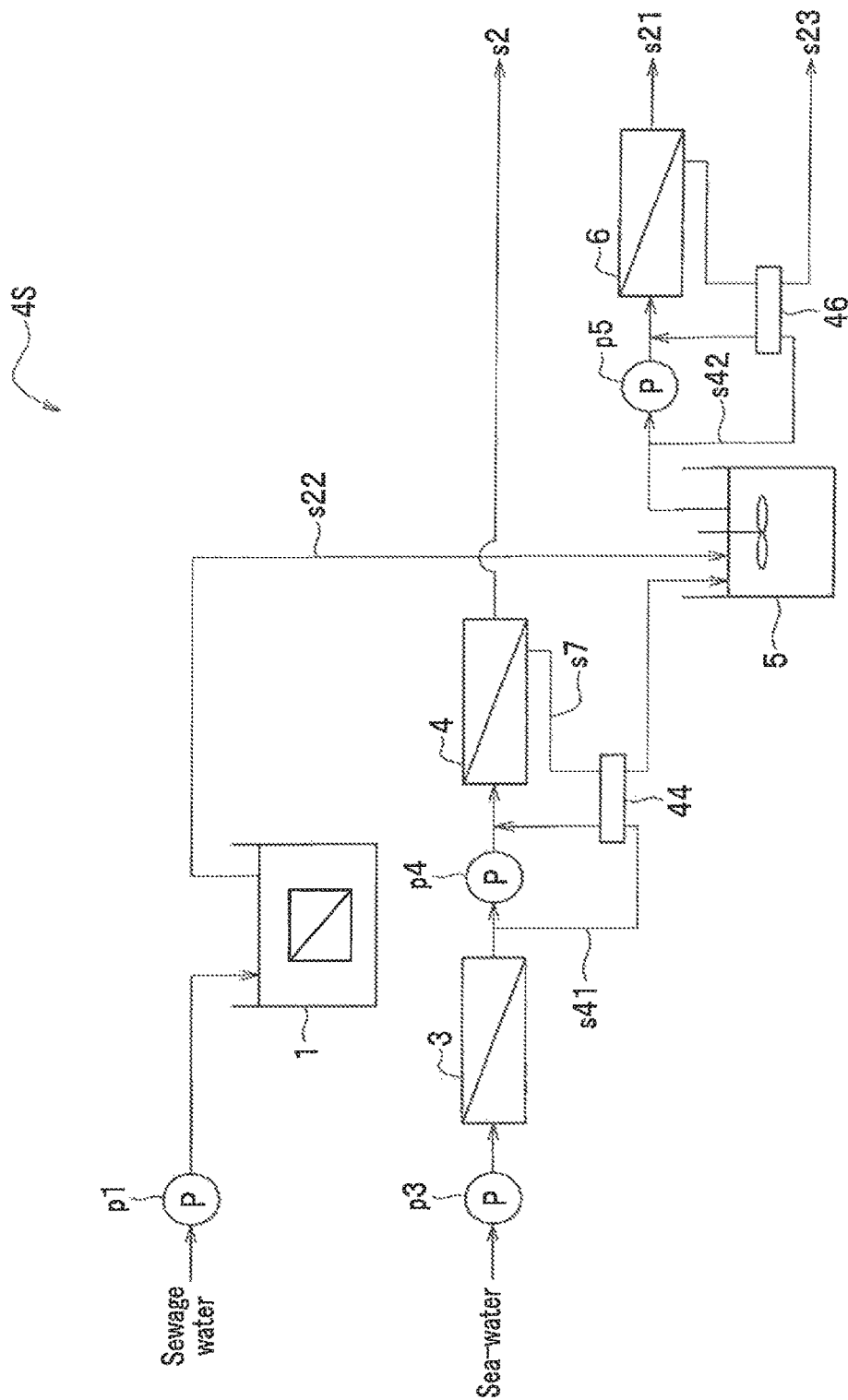
FIG. 4 is a conceptual configuration diagram showing the desalination system of the variation 2.

FIG. 4 is a conceptual configuration diagram showing the desalination system of the variation 2.

The desalination system 4S of the variation 2 provides the energy recovery device 44, 46 in the down-stream of the exclusion flow (s41, s42) of the high-pressure RO membrane 4, 6, in the desalination system 2S of the embodiment 2, similarly to the variation 1.

The other configuration is similar to the desalination system 2S of the embodiment 2, therefore, the identical components are shown with identical references, and the in-depth description is omitted.

The desalination system 4S of the variation 2 can recover the pressure energy of the sea-water concentrated-water s7, the brine water 23 as the rotational energy respectively in the energy recovery device 44, 46, and the pressure transfer power of the UF membrane permeation sea-water s41, the stirring-vessel passage water s42 can be acquired respectively.

In the desalination system 3S of the variation 2, it is possible to reduce the power (energy) of the desalination system 2S of the embodiment 2, and to achieve the energy conservation.

<<Other Embodiments>>

Incidentally, in the variation 1, the case to provide both of the energy recovery device 34, 36 has been exemplified, however, either of the energy recovery device 34, 36 may be constituted to be provided. Similarly, in the variation 2, the case to provide both of the energy recovery device 44, 46 has been exemplified, however, either of the energy recovery device 44, 46 may be constituted to be provided.

Moreover, in the variation 1, the case to utilize the power recovered in the energy recovery device 34, 36 for the pressure transfer power of the UF membrane permeation sea-water s31, the stirring-vessel passage water s32 respectively has been exemplified, however, it may be utilized for the other power. Similarly, in the variation 2, the case to utilize the power recovered in the energy recovery device 44, 46 for the pressure transfer power of the UF membrane permeation sea-water s41, the stirring-vessel passage water s42 respectively has been exemplified, however, it may be utilized for the power which is different from the exemplified one.

Incidentally, in the aforementioned embodiments and the variations, the MBR has been exemplified as a purification apparatus to remove the activated sludge from the sewage water and to purify, however, the purification apparatus which is different from the MBR 1, such as the plain sedimentation method, the sand filtration, the disinfection or the like, may be applied.

Moreover, the numerical values utilized in the description of the aforementioned embodiments and the variations have shown one example, and these numerical values are not to be limited to,

EXPLANATION OF REFERENCES

1 MBR (purification apparatus)
2 low-pressure RO membrane (first RO membrane)
3 UF membrane
4 high-pressure RO membrane (second RO membrane, first RO membrane)
5 stirring-vessel (stirring apparatus)
6 high-pressure RO membrane (third RO membrane, second RO membrane)
34 energy recovery device (first energy recovery device)
36 energy recovery device (second energy recovery device)
44 energy recovery device (first energy recovery device)
46 energy recovery device (second energy recovery device)
S desalination system (the sea-water desalination system)
s1, s3 industrial water
s2 drinking water
s3 industrial water
s5b UF membrane permeation sea-water (treated water)
s6 sewage water concentrated-water (first concentrated-water)
s7 sea-water concentrated-water (second concentrated-water, first concentrated-water)
s9 brine water (third concentrated-water)
s21 industrial water
s22 MBR permeable water (treated water)
s23 brine water (second concentrated-water)

The invention claimed is:

1. A sea-water desalination method for preparing industrial water and drinking water from sea-water and sewage water, the method comprising
    producing a first stream of industrial water by making the sewage water permeate a permeation apparatus and a first RO membrane;
    producing drinking water by making sea-water permeate a UF membrane and a second RO membrane;
    producing a mixture fluid by mixing a first concentrated water removed by the first RO membrane and a second concentrated water removed by the second RO membrane; and
    producing a second stream of industrial water by making a the mixture fluid permeate a third RO membrane,
    wherein the drinking water is prepared exclusively from the sea-water.

2. A sea-water desalination method according to claim 1, comprising recovering at least either of pressure energy of the second concentrated-water removed by the second RO membrane or pressure energy of a third concentrated-water removed by the third RO membrane.

* * * * *